Figure 1:
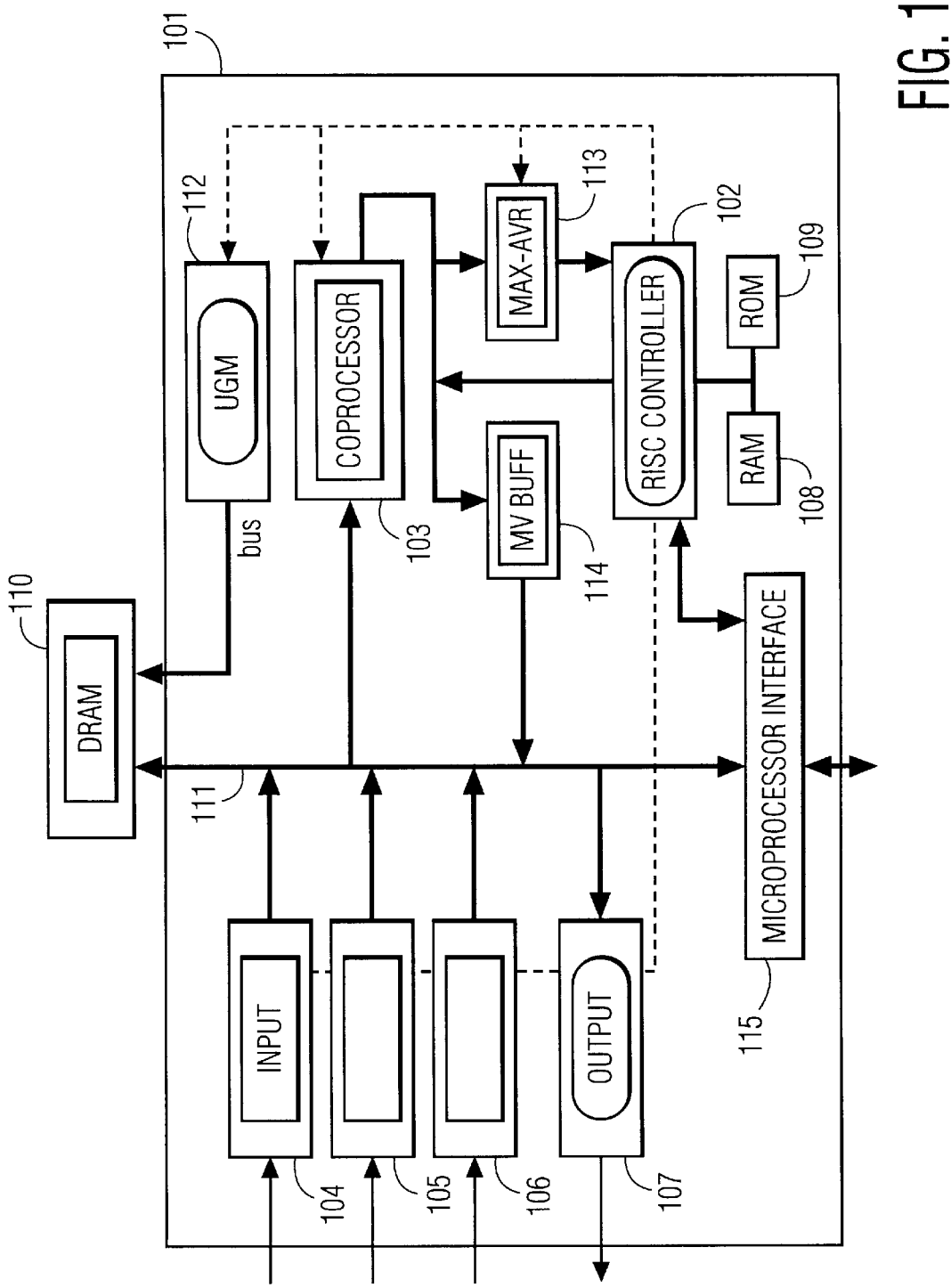

United States Patent

Daoudi et al.

[11] Patent Number: 5,870,500
[45] Date of Patent: Feb. 9, 1999

[54] METHOD FOR PROCESSING DATA IN MATRIX ARRAYS IN A MOTION ESTIMATION SYSTEM

[75] Inventors: Mohamed Daoudi, Eybens; Alain Pirson, Moirans, both of France

[73] Assignee: Thomson multimedia S.A., France

[21] Appl. No.: 758,115

[22] Filed: Nov. 25, 1996

[30] Foreign Application Priority Data

Dec. 6, 1995 [FR] France .................................. 95 14432

[51] Int. Cl.⁶ ........................................................ G06K 9/36
[52] U.S. Cl. ........................................................ 382/236
[58] Field of Search .................................. 382/232, 236, 382/248, 250; 358/432, 433; 348/384, 394, 395, 400–404, 407–416, 420, 421, 425, 430, 431

[56] References Cited

U.S. PATENT DOCUMENTS

| | | | |
|---|---|---|---|
| 5,198,901 | 3/1993 | Lynch | 348/419 |
| 5,226,093 | 7/1993 | Iwase | 382/236 |
| 5,467,413 | 11/1995 | Barrett | 382/236 |
| 5,535,288 | 7/1996 | Chen et al. | 382/236 |
| 5,570,133 | 10/1996 | Yagasaki | 382/236 |
| 5,594,813 | 1/1997 | Fandrianto et al. | 382/236 |
| 5,596,369 | 1/1997 | Chau et al. | 348/402 |
| 5,631,744 | 5/1997 | Takeuchi et al. | 358/432 |
| 5,636,293 | 6/1997 | Lin et al. | 382/236 |
| 5,644,306 | 7/1997 | Brent | 341/67 |
| 5,742,710 | 4/1998 | Hsu et al. | 382/236 |
| 5,745,605 | 4/1998 | Bard et al. | 382/236 |

OTHER PUBLICATIONS

Microprocessors and Microsystems, vol. 17, No. 7, Sep. 1993, London, GB pp. 425–434, Amanda Richardson et al. "Sti 3220 motion estimation processor".

Proceedings of the 1995 International Conference on Acoustics, Speech, and Signal Porcessing, May 9–12, 1995, Detroit, US IEEE New York (US) Alain Pirson et al. "A programmable motion estimation processor for full search block matching" p. 3285.

1989 IEEE International Symposium On Circuits & Systems, Portland (US) May 8–11, 1989, IEEE Press, NY (US) pp. 179–182, Ming–Ting Sun et al. "A flexible architecture for full–search block–matching motion vector estimation".

Primary Examiner—Jose L. Couso
Attorney, Agent, or Firm—Joseph S. Tripoli; Frederick A. Wein; Alexander J. Burke

[57] ABSTRACT

A method of processing data in matrix arrays in a motion estimation system is characterized in that each array (803, 804) performing a calculation of distortion (Err) for a block of pixels (1, 2) of a current image, at least two arrays (803, 804) being arranged in series performing the calculations for at least two adjacent blocks (1, 2) of the said current image, the reference window corresponding to the entirety of these blocks being introduced in bands of pixels into the first of the said arrays (803) and propagating from array to array in the said series of arrays, the allocation of the blocks (1, 2) to the arrays and the direction of introduction of the band into the arrays being such that the last part (c, respectively A) of the band introduced into the array corresponds to a part of the window of the block (2, respectively 1) allocated to the first of the arrays (803).

5 Claims, 7 Drawing Sheets

METHOD FOR PROCESSING DATA IN MATRIX ARRAYS IN A MOTION ESTIMATION SYSTEM

The present invention relates to a method of processing data in matrix arrays in a motion estimation system. The method according to the invention is used in particular in television image encoders which use a method of motion compensation.

A number of image compression systems are based on processing in blocks of pixels. In the case of MPEG2 (standing for "Motion Picture Expert Group"), the images are divided into blocks of 8*8 pixels, four blocks being assembled into a macroblock of 16*16 pixels. The blocks or the macroblocks undergo various processing operations to reduce the redundancy between images and within an image. One of the processing operations used is motion estimation. This method consists in estimating the shift of a part of the current image with respect to previous or future images. In this way one or more motion vectors are determined which define the shift. These motion vectors make it possible to obtain, from the previous or future images, a prediction of the current image. The difference is then determined between this prediction and the current image, and it is this difference which is used for the subsequent compression. Currently, motion vectors are used for so-called "inter" and "bi-directional" images, but may also be used for so-called "intra" images, with the aim of reducing the effects of any transmission errors.

The motion estimation is generally performed for each macroblock. Instead of a previous image, it is also possible to use a reference image stored in the encoder, this image corresponding to the image decoded by a decoder (that is to say an image which takes into account the information losses due to compression).

A technique for determining the "best" macroblock in the reference image consists in comparing the current macroblock with each macroblock of the reference image. An error function Err, calculated for each possible position of the macroblock in the reference image, is used as comparison criterion. The position giving the smallest value for the function Err will determine the shift vector. The latter can have various accuracies, depending on the calculational capacity available and the pass-band reserved for the coding of the motion vectors. An accuracy of a fraction of a pixel can be implemented by inter-pixel interpolation. If the motion vectors are restricted in amplitude, a search window of appropriate size is placed around the position defined by the current macroblock.

Calculation of the motion vectors demands large calculational capacities which increase with the accuracy desired, the resolution of the image, their frequency etc.

A conventionally used error function is:

$$Err(m,n) = \sum_i \sum_j D(a(i,j), b(i+m, j+n))$$

where i and j denote positions inside a macroblock, where m and n denote coordinates of a motion vector and where a and b respectively denote luminance values of pixels of the current macroblock and of the shifted macroblock of the window or search image.

The function D can be for example $D(x,y) = |x-y|$.

Co-pending application Ser. No. 08/511,483 filed on 4th Aug. 1995, and issued on Apr. 28, 1998, as U.S. Pat. No. 5,745,605, is concerned with related subject matter.

Systolic arrays are circuits which evaluate the distortion between a current pixel block and a block of the same size of a search window of a past or future image. Systolic arrays possess storage elements for storing the current blocks, these current blocks being compared with blocks of the same size from a reference window. The blocks of the reference window are introduced in the form of bands of pixels into the systolic arrays and propagate therein column by column.

The various systolic arrays of the coprocessor can be used in various operating modes. In particular, systolic arrays in series can be configured to process different current blocks.

The objective of the invention is to optimize the feeding of the systolic arrays with data.

The subject of the invention is a method of processing data in matrix arrays in a motion estimation system, characterized in that each array performing a calculation of distortion for a block of pixels of a current image, at least two arrays being arranged in series performing the calculations for at least two adjacent blocks of the said current image, the reference window corresponding to the entirety of these blocks being introduced in bands of pixels into the first of the said arrays and propagating from array to array in the said series of arrays, the allocation of the blocks to the arrays and the direction of introduction of the band into the arrays being such that the last part of the band introduced into the array corresponds to a part of the window of the block allocated to the first of the arrays.

According to a particular embodiment, the reference windows are centred about the positions of the current blocks, the windows of two adjacent blocks thus being offset by one block.

According to a particular embodiment, the various windows having identical dimensions, the allocation of the blocks to the arrays and the direction of introduction of the band into the arrays are such that the first results of the distortion calculations performed by the various arrays are available at the same time.

According to a particular embodiment, a first block and a second block which are horizontally adjacent are processed respectively by a first array and a second array arranged in series in this order, the introduction of the band of pixels commencing with the first array in a direction such that the part of the band corresponding to the window associated with the second block is introduced first.

According to a particular embodiment, when the end of a band of pixels corresponds to reference window parts not normally requiring to be taken into account by a particular array processing a given block, the calculation results obtained from the data corresponding to the said window parts are nevertheless taken into account so as to widen the reference window normally associated with the block processed by the said particular array.

Figure 2A:
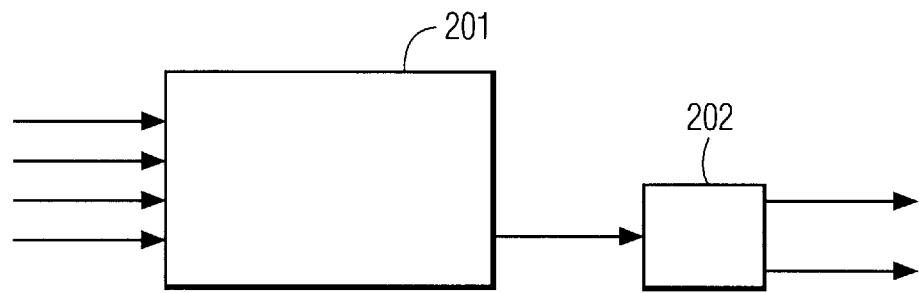
Figure 2B:
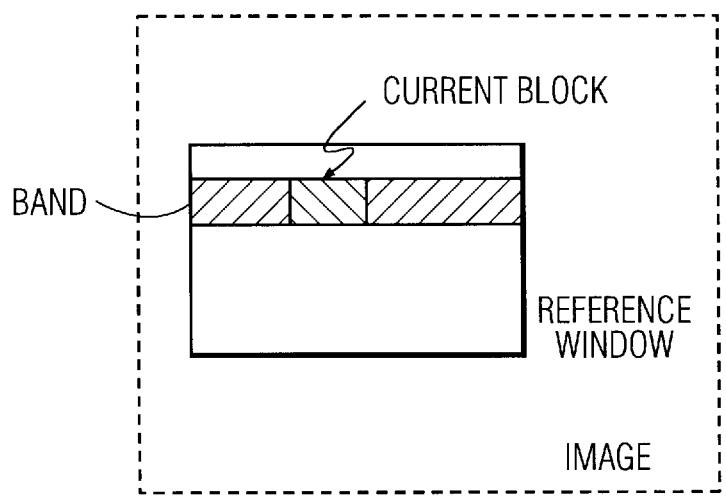
Figure 3:
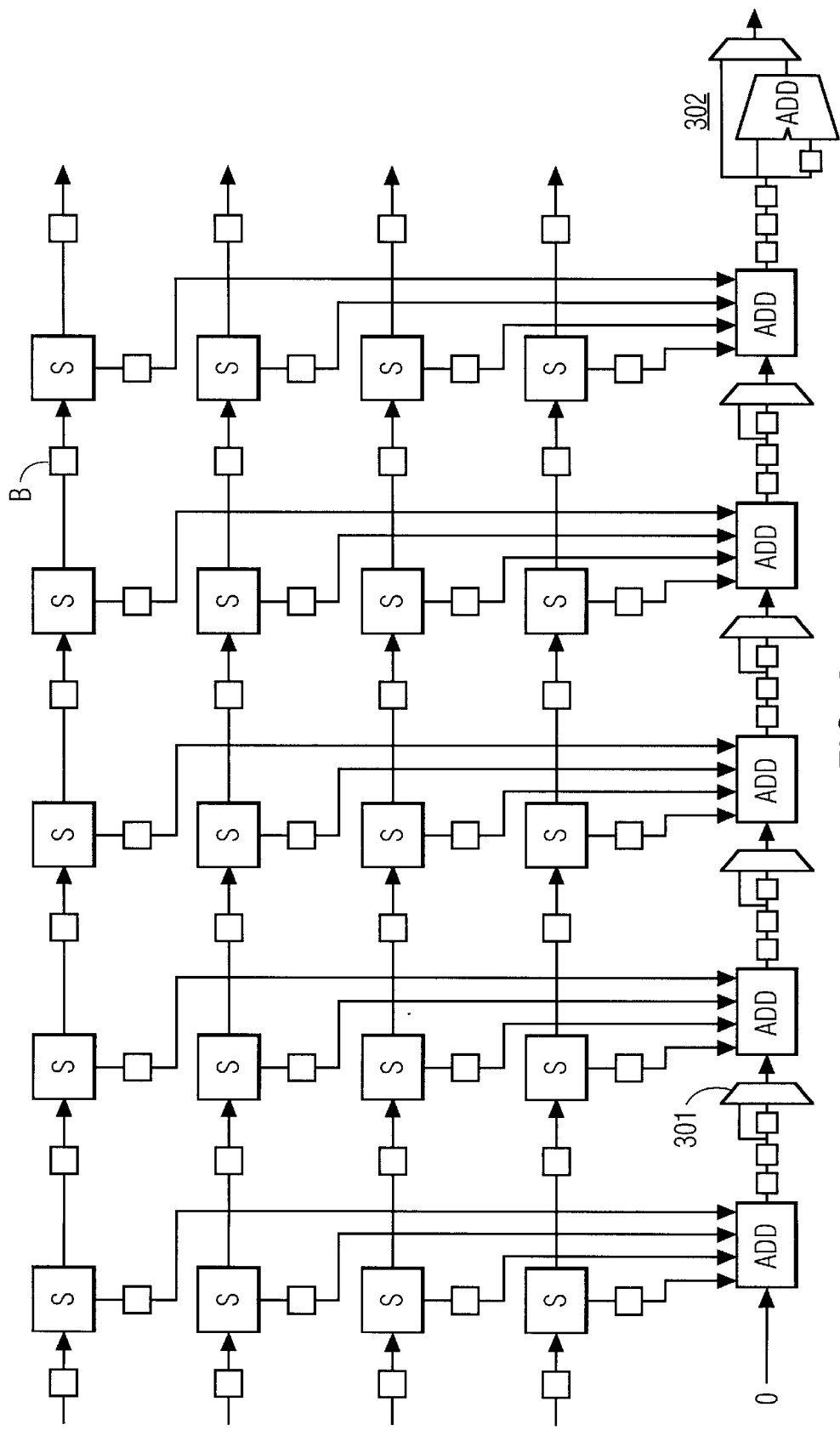
Figure 4:
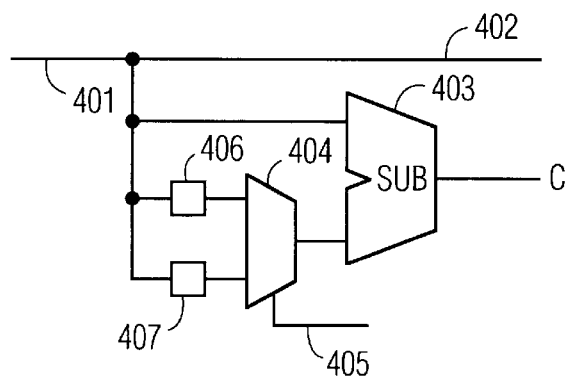
Figure 8:
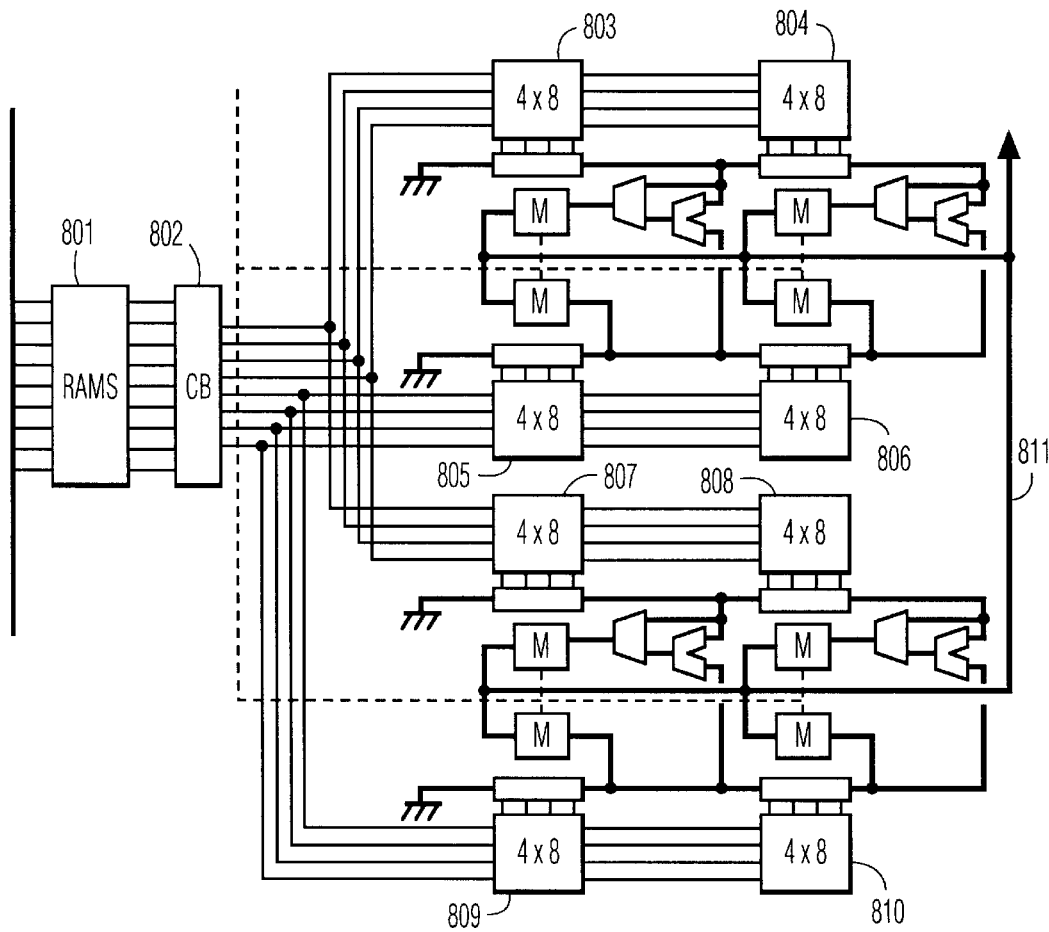
Figure 5:
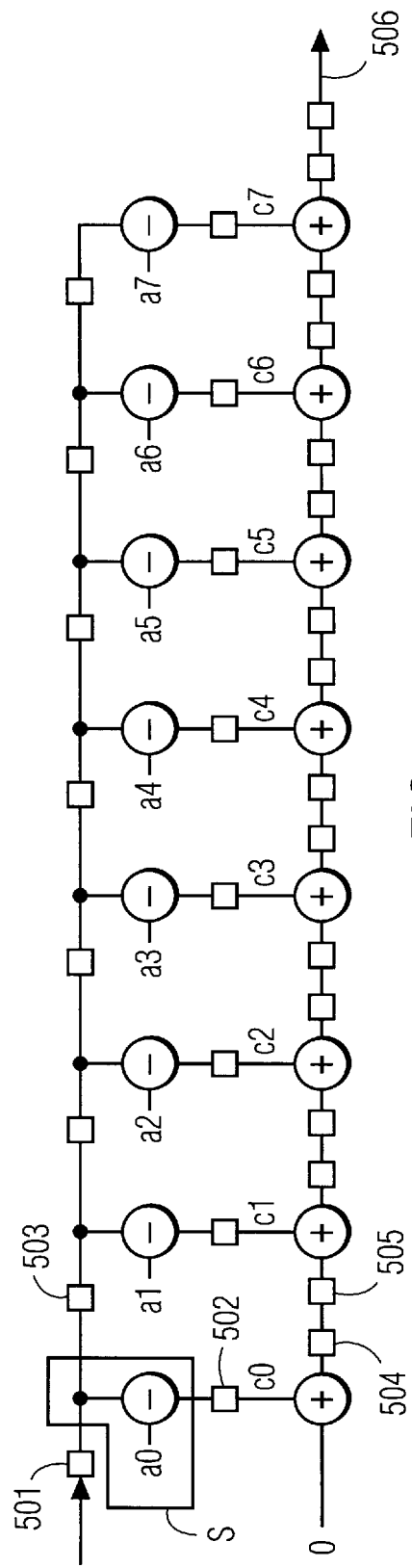
Figure 6:
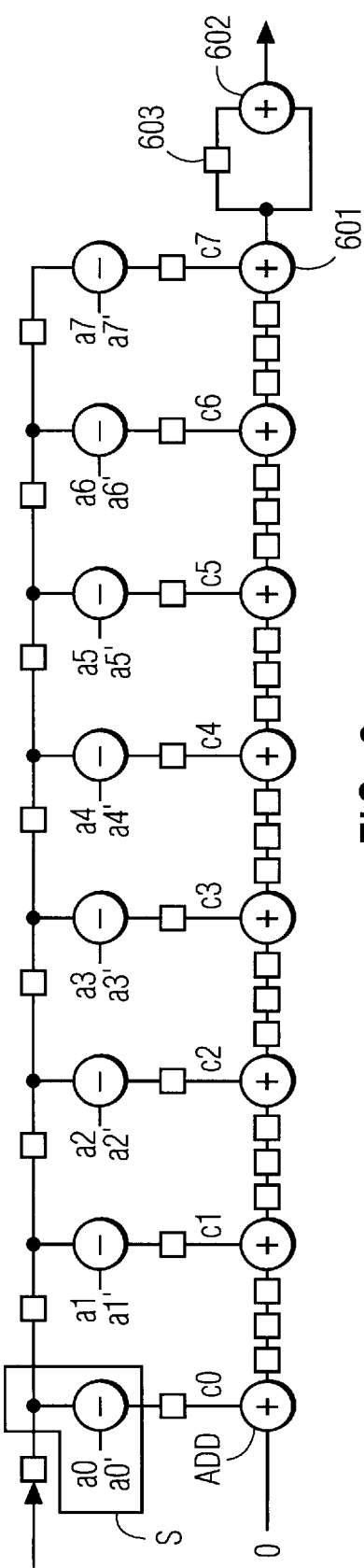
Figure 7:
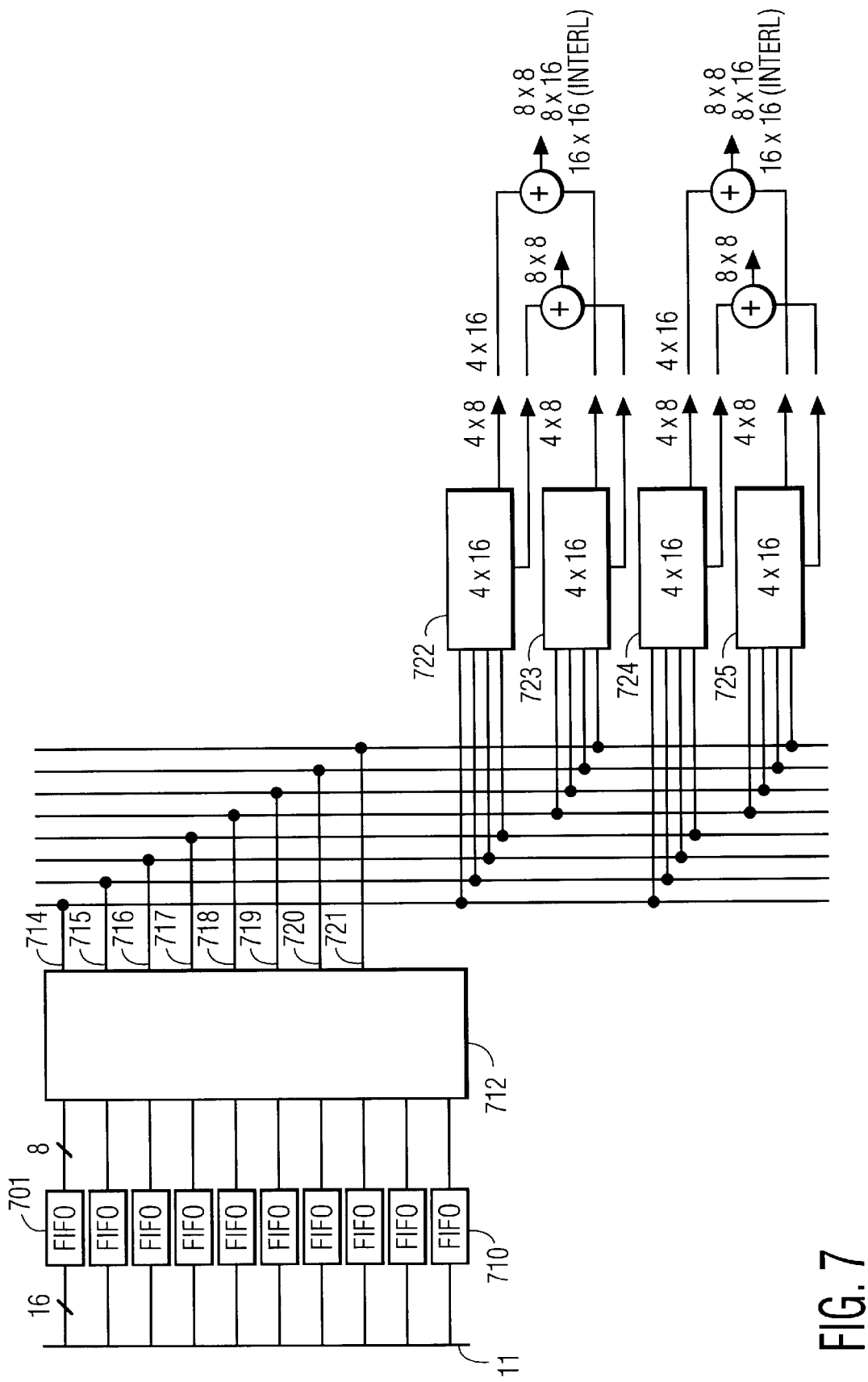
Figure 9:
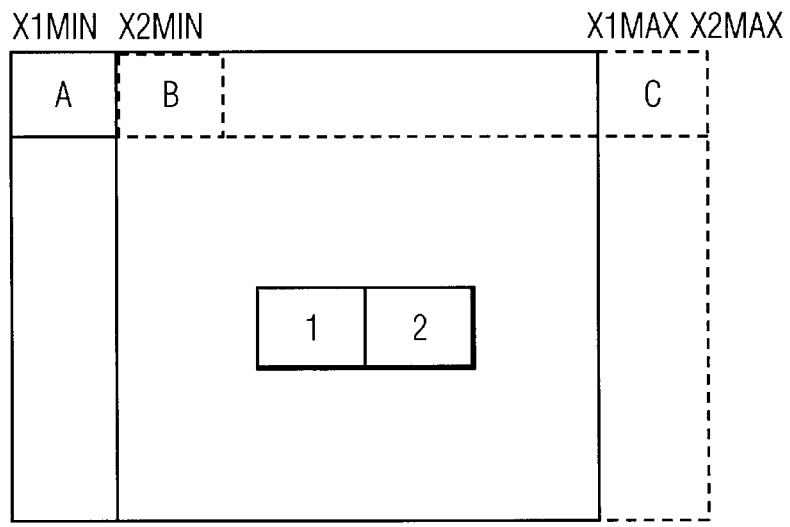
Figure 10:
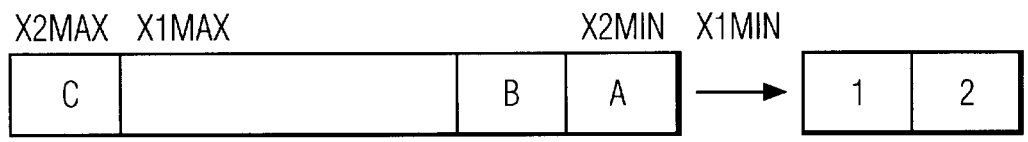
Figure 11:
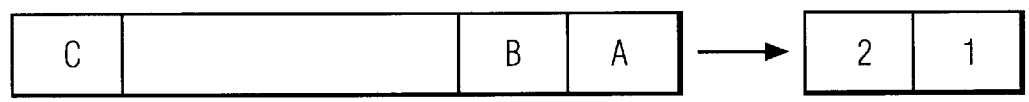
Figure 12:

Other characteristics and advantages of the invention will emerge through the description of a particular non-limiting example embodiment illustrated by the attached figures, in which:

FIG. 1 represents a functional diagram of a motion estimation processor,

FIGS. 2a and 2b schematically represent the comparison strategy employed in accordance with the present example embodiment, FIG. 3 represents a functional diagram of a systolic array used for the calculation of the motion vectors, FIG. 4 represents a functional diagram of a so-called "S" cell of the systolic array of FIG. 3, FIG. 5 represents a functional diagram of a simplified systolic array allowing illustration of the operation in non-interlaced mode, FIG. 6 represents a functional diagram of a simplified systolic array allowing illustration of the operation in interlaced mode, FIG. 7 represents a functional diagram of the coprocessor in accordance with a first variant, FIG. 8 represents a functional diagram of the coprocessor in accordance with a second variant, FIG. 9 represents the arrangement of two reference windows corresponding to two adjacent current blocks, FIG. 10 represents the feeding with data of two systolic arrays in series in accordance with a first example, FIG. 11 represents the feeding with data of two systolic arrays in series in accordance with a first example embodiment of the invention, FIG. 12 represents the feeding with data of two systolic arrays in series in accordance with a second example embodiment of the invention.

An example of a motion estimation processor implementing the invention will firstly be described. More particular stress will be placed on the description of the coprocessor which is the element which performs the calculation of the error associated with each motion vector.

For further information on the use of motion vectors in image compression to MPEG standards, refer to:

"Information technology, Generic coding of moving pictures and associated audio, Recommendation H.262 ISO/IEC 13818-2 (Video) Committee Draft of November 1993."

The motion estimation processor makes it possible to calculate various types of motion vectors, depending on the demands of the MPEG standard: vectors for frames or images, vectors from a previous image to the current image or from a future image to the current image (or "forward vectors" and "backward vectors" respectively) etc. Subsequently, for the sake of clarity, the example of vectors from a previous image to the current image (forward vectors) will be taken. Of course, the invention is not limited to the example embodiment presented.

FIG. 1 illustrates in a functional manner a motion estimation processor 101. The processor 101 comprises a RISC controller 102 (RISC standing for: "Reduced Instruction Set Computer"), a systolic-array coprocessor 103, three independent input ports 104, 105, 106 for loading the images, an output port 107 for delivering the motion vectors, as well as a local RAM and local ROM (respectively referenced 108 and 109).

The presence of several independent input ports makes it possible to work on as many independent video sources. According to a variant embodiment, each input port is furnished with a subsampling circuit for implementing a hierarchized motion estimation.

The various sub-assemblies mentioned communicate through a data bus 111 which among other things is connected to a DRAM external memory 110. A memory management unit 112 handles the flow of data between the local memories. The data corresponding to the images (reference or current images) are conveyed to the dynamic memory 110. They are next read out so as to be submitted in due time to the coprocessor 103. The motion vectors calculated by the coprocessor 103 are sent to the dynamic memory 110 via a buffer memory MV BUFF 114. At the opportune moment, these vectors are read out and transmitted by way of the output port 107.

The processor 101 is also furnished with a microprocessor interface 115 intended for the programming and configuring of the RISC controller 102 by downloading of code and calculation parameters. The motion vectors stored in the dynamic memory 110 are also accessible through the interface 115.

A unit MAX-AVR 113 calculates the mean motion vector and the maximum motion vector for each image.

The RISC controller 102 is, according to the present example, a 19-bit processor containing 62 registers and a 64-word data memory. The role of the controller 102 is to handle the requests from the various units of the processor 101 and to activate them in due time.

The RISC controller 102 is connected to the local RAM 108 and to the local ROM 109, the latter containing commonly used routines.

The coprocessor 103 includes several systolic arrays working in parallel or in series, depending on the programmed configuration. In what follows we shall firstly describe the operation of a single systolic array. This will provide for a better understanding of the operation of the coprocessor 103 which, according to the present example, amalgamates 8 of these arrays.

FIG. 2a illustrates the simplest case of the flow of information in the systolic array. The basic function of the array is to compare a current pixel block with the contents of a reference window. The current block is stored in the systolic array 201. The reference window is conveyed in bands to the array. For each possible position, the error function Err is calculated.

An element 202 determines the most appropriate vector on the basis of the various values of the error function for one and the same current block, but different blocks extracted from the search window. This element will be described in greater detail later.

FIG. 2b illustrates the process for determining the bands to be delivered to the systolic array. Each band has a number of lines of pixels which corresponds to the number of lines of the array (4 according to the present example). The first band contains the first four lines of the reference window. When the first band has been fully processed, the processing is continued with the next band, which contains the last three lines of the first band, as well as the line immediately following this first band. Each band is therefore offset by one line with respect to the preceding band.

Each band is delivered to the systolic array column by column. The current block, having the same number of lines as each band, is thus compared with all the blocks of like size of each band. Ultimately, the current block will have been compared with all the blocks of like size of the reference window. As many values of the error function will have been calculated and transmitted to the element 202.

It will be noted that two bands differ only by one line of pixels. This redundancy will be exploited later in order to limit the loading of the data from the memory 10.

FIG. 3 illustrates a systolic array of four lines and five columns. This array comprises so-called "S" cells, buffers "B", adders "Add", bypass cells 301 and a final bypass cell 302.

The S cells execute the calculation |a−b|, where a and b are respectively the values of a pixel of the current block and of a pixel of the reference window. The output of each S cell of one and the same line is linked by a buffer B to the input of the next S cell. A buffer B is also present ahead of each first S cell of a line. The pixel values b propagate from one buffer to a next buffer in one and the same line at each cycle. The buffers hold the values b while the S cells perform their calculations.

Each S cell also possesses an output C which delivers the result of the operation |a−b|. The outputs C are likewise connected to buffers B. All the buffers B of one and the same column are linked to one and the same adder Add. There are therefore as many adders as columns.

The output of an adder is linked to the input of the next adder by three buffers B in series. Depending on the mode of operation chosen, the last of these three buffers is or is not short-circuited by a bypass cell 301.

The final bypass cell delivers either a value of the error function at each cycle in non-interlaced normal operation, or a value of the error function every two cycles in interlaced mode. In the latter case, the adder integrated into this final bypass cell 302 adds up two consecutive values of the error function.

According to a variant embodiment, the adders Add are embodied with the aid of three-input carry save adders.

FIG. 4 represents in greater detail the functions of an S cell. The S cell comprises an input 401, an output 402 linked directly to the input 401, a calculation unit 403 possessing two inputs of which one is linked to the input 401 and the other to the output of a multiplexer 404 making it possible to select by way of a selection line 405 either the contents of a buffer 406 or the contents of a buffer 407. The inputs of the buffers 406 and 407 are likewise linked to the input 401 of the cell.

Each of the two buffers contains a pixel value of a current block. These values are loaded via the input 401 at the opportune moment. The control circuits of the buffers are conventional and will not be illustrated in greater detail. The presence in parallel of two buffers makes it possible among other things to store at the same time two current blocks in a single systolic array. Thus, two comparisons may be performed for one and the same position in the reference window. The quantity of data travelling between the dynamic memory 10 and the coprocessor 3 is thus reduced.

The presence of two buffers in each S cell moreover allows so-called interlaced operation which makes it possible to double the number of lines of the current block with respect to the number of lines of the systolic array. This operation will be investigated later.

The calculation unit delivers the absolute value of the difference of the two values presented to its inputs.

It will be noted that within the framework of this example, the values b of the pixels of the reference window are stored in the buffers B between the S cells, whereas the values a of the pixels of the current block or blocks are stored in the buffers of the S cells.

It will also be noted that the function of accumulating the intermediate results produced by the S cells is carried out wholly by the adders at the foot of each column of S cells.

The normal operation (non-interlaced) of the systolic array will be explained with the aid of the schematic of FIG. 5. This schematic represents a systolic array comprising a single line and eight columns. The operation of an array with a larger number of lines is entirely similar, the results output by each S cell (output S) being presented at the same moment with the adders. Within the framework of normal operation, only two buffers B are necessary between each end-of-column adder. For the sake of clarity in the schematic, the third buffer and the bypass cell are not illustrated.

The pixel values a are already stored in the array. A value b is presented to the input of the array at each cycle. Table 1 represents the course of the outputs C over a number of cycles.

TABLE 1

| C. | C0 | C1 | C2 | C3 | C4 | C5 | C6 | C7 |
|---|---|---|---|---|---|---|---|---|
| 0 | — | — | — | — | — | — | — | — |
| 1 | \|b0-a0\| | — | — | — | — | — | — | — |
| 2 | \|b1-a0\| | \|b0-a1\| | — | — | — | — | — | — |
| 3 | \|b2-a0\| | \|b1-a1\| | \|b0-a2\| | — | — | — | — | — |
| 4 | \|b3-a0\| | \|b2-a1\| | \|b1-a2\| | \|b0-a3\| | — | — | — | — |
| 5 | \|b4-a0\| | \|b3-a1\| | \|b2-a2\| | \|b1-a3\| | \|b0-a4\| | — | — | — |
| 6 | \|b5-a0\| | \|b4-a1\| | \|b3-a2\| | \|b2-a3\| | \|b1-a4\| | \|b0-a5\| | — | — |
| 7 | \|b6-a0\| | \|b5-a1\| | \|b4-a2\| | \|b3-a3\| | \|b2-a4\| | \|b1-a5\| | \|b0-a6\| | — |
| 8 | \|b7-a0\| | \|b6-a1\| | \|b5-a2\| | \|b4-a3\| | \|b3-a4\| | \|b2-a5\| | \|b1-a6\| | \|b0-a7\| |
| 9 | \|b8-a0\| | \|b7-a1\| | \|b6-a2\| | \|b5-a3\| | \|b4-a4\| | \|b3-a5\| | \|b2-a6\| | \|b1-a7\| |
| 10 | \|b9-a0\| | \|b8-a1\| | \|b7-a2\| | \|b6-a3\| | \|b5-a4\| | \|b4-a5\| | \|b3-a6\| | \|b2-a7\| |
| 11 | \|b10-a0\| | \|b9-a1\| | \|b8-a2\| | \|b7-a3\| | \|b6-a4\| | \|b5-a5\| | \|b4-a6\| | \|b3-a7\| |
| 12 | \|b11-a0\| | \|b10-a1\| | \|b9-a2\| | \|b8-a3\| | \|b7-a4\| | \|b6-a5\| | \|b5-a6\| | \|b4-a7\| |
| 13 | \|b12-a0\| | \|b11-a1\| | \|b10-a2\| | \|b9-a3\| | \|b8-a4\| | \|b7-a5\| | \|b6-a6\| | \|b5-a7\| |
| 14 | \|b13-a0\| | \|b12-a1\| | \|b11-a2\| | \|b10-a3\| | \|b9-a4\| | \|b8-a5\| | \|b7-a6\| | \|b6-a7\| |
| 15 | \|b14-a0\| | \|b13-a1\| | \|b12-a2\| | \|b11-a3\| | \|b10-a4\| | \|b9-a5\| | \|b8-a6\| | \|b7-a7\| |

During cycle 0, the value b0 is stored in the first buffer B (reference 501) at the input of the array. It is only at cycle 1 that the result delivered by the first S cell is stored in the buffer 502 at the output C0. During cycle 1, the value b0 is likewise stored by the second buffer B 503.

At a given moment in the operation of the array, the sum of all absolute values of the differences corresponding to a given position of the current block (in this instance a line of 8 pixels) in the reference window will have to be retrieved at the output of the last adder. The results which have to be appended at adder level to the first line of the reference window are indicated in bold in the table.

This accumulation function conditions the lag introduced by the buffers 504 between the adders. It is easy to see that a lag of two cycles must be introduced in order for the propagation of the results at the level of the adders to occur properly. This explains the presence of two buffers between each adder. Each buffer introduces a lag of one cycle. Stated otherwise, the two buffers 504 and 505 between the first two adders cancel out the lag introduced by the buffers 501 and 502.

At the end of the fifteenth cycle, the value of the function Err for the first possible position of the current block is presented at the output 506 of the array.

It will be noted that when operating thus, only one of the two values a stored in each S cell is used. According to a variant embodiment, a single buffer for storing the pixel values of the current block is used in each S cell.

FIG. 6 and Table 7 illustrate the operation of a systolic array in so-called interlaced mode. This mode makes it possible to determine error functions for current blocks containing a number of lines equal to double the number of lines of the systolic array. This is carried out simply by appending an extra buffer in each S cell as well as an extra buffer between each adder.

FIG. 6 is similar to FIG. 5, apart from the fact that an extra buffer is inserted between each pair of adders. Moreover, each S cell includes the two internal buffers illustrated in FIG. 4. During the even cycles, the contents of the first buffer of each S cell are multiplexed to the corresponding calculation unit, whereas the contents of the second buffer are used during odd cycles.

According to a variant embodiment, the systolic array is designed to process current blocks possessing a number of lines equal to N times the number of lines of the array, where N is an integer greater than 2. In this case, as many buffers as necessary will be provided in each S cell.

TABLE 2

| C. | C0 | C1 | C2 | C3 | C4 | C5 | C6 | C7 |
|---|---|---|---|---|---|---|---|---|
| 0 | — | — | — | — | — | — | — | — |
| 1 | \|b0-a0\| | — | — | — | — | — | — | — |
| 2 | \|b0'-a0'\| | \|b0-a1\| | — | — | — | — | — | — |
| 3 | \|b1-a0\| | \|b0'-a1'\| | \|b0-a2\| | — | — | — | — | — |
| 4 | \|b1'-a0'\| | \|b1-a1\| | \|b0'-a2'\| | \|b0-a3\| | — | — | — | — |
| 5 | \|b2-a0\| | \|b1'-a1'\| | \|b1-a2\| | \|b0'-a3'\| | \|b0-a4\| | — | — | — |
| 6 | \|b2'-a0'\| | \|b2-a1\| | \|b1'-a2'\| | \|b1-a3\| | \|b0'-a4'\| | \|b0-a5\| | — | — |
| 7 | \|b3-a0\| | \|b2'-a1'\| | \|b2-a2\| | \|b1'-a3'\| | \|b1-a4\| | \|b0'-a5'\| | \|b0-a6\| | — |
| 8 | \|b3'-a0'\| | \|b3-a1\| | \|b2'-a2'\| | \|b2-a3\| | \|b1'-a4'\| | \|b1-a5\| | \|b0'-a6'\| | \|b0-a7\| |
| 9 | \|b4-a0\| | \|b3'-a1'\| | \|b3-a2\| | \|b2'-a3'\| | \|b2-a4\| | \|b1'-a5'\| | \|b1-a6\| | \|b0'-a7'\| |
| 10 | \|b4'-a0'\| | \|b4-a1\| | \|b3'-a2'\| | \|b3-a3\| | \|b2'-a4'\| | \|b2-a5\| | \|b1'-a6'\| | \|b1-a7\| |
| 11 | \|b5-a0\| | \|b4'-a1'\| | \|b4-a2\| | \|b3'-a3'\| | \|b3-a4\| | \|b2'-a5'\| | \|b2-a6\| | \|b1'-a7'\| |
| 12 | \|b5'-a0'\| | \|b5-a1\| | \|b4'-a2'\| | \|b4-a3\| | \|b3'-a4'\| | \|b3-a5\| | \|b2'-a6'\| | \|b2-a7\| |
| 13 | \|b6-a0\| | \|b5'-a1'\| | \|b5-a2\| | \|b4'-a3'\| | \|b4-a4\| | \|b3'-a5'\| | \|b3-a6\| | \|b2'-a7'\| |
| 14 | \|b6'-a0'\| | \|b6-a1\| | \|b5'-a2'\| | \|b5-a3\| | \|b4'-a4'\| | \|b4-a5\| | \|b3'-a6'\| | \|b3-a7\| |
| 15 | \|b7-a0\| | \|b6'-a1'\| | \|b6-a2\| | \|b5'-a3'\| | \|b5-a4\| | \|b4'-a5'\| | \|b4-a6\| | \|b3'-a7'\| |
| 16 | \|b7'-a0'\| | \|b7-a1\| | \|b6'-a2'\| | \|b6-a3\| | \|b5'-a4'\| | \|b5-a5\| | \|b4'-a6'\| | \|b4-a7\| |

The double-sized current block is separated into two vertically overlaid sub-blocks a and a'. The first sub-block a is stored in the first buffers of each S cell, whereas the second sub-block a' is stored in the second buffers of each S cell.

The band of the reference window possesses in identical manner double the number of lines. It comprises an upper sub-band b and a lower sub-band b'. During an even cycle, a column of sub-band b is presented at the input of the systolic array, whereas a column of b' is presented during the odd cycles.

Table 2 gives the state of the outputs c after each cycle. As before, the bold characters indicate the intermediate results which will have to be added up to form an error function corresponding to a sub-block.

Alternating between the two sub-blocks and the two sub-bands introduces, with respect to non-interlaced operation, an extra delay of one cycle between the presence at the output of an adder of the aggregate error corresponding to a given position and the presence of the intermediate result corresponding to the input of the next adder. For this reason, a third buffer is inserted between each pair of adders.

The last adder 601 of the array of FIG. 6 is linked on the one hand to a first input of an adder 602 and on the other hand to a buffer 603 whose output is linked to the second input of the adder 602.

The error function corresponding to a sub-block is delivered to the output of the adder 601 at each cycle (once the array has been correctly initialized). Table 2 shows that the error function value corresponding to sub-block a' lags one cycle behind that corresponding to sub-block a. The two values must be added together to obtain the value of the error function corresponding to the complete block a+a'. During a first cycle, the value corresponding to a is stored in the buffer 603. In the next cycle, the value corresponding to the block a' is present at the output of the adder 601. The adder 602 performs the sum. A valid result is therefore present at the output of the adder 602 every two cycles.

This so-called interlaced mode of operation is very beneficial since it makes it possible to reduce the size of the data bus which conveys the bands of pixels to the coprocessor.

FIG. 7 schematically represents the coprocessor according to a first variant of the example embodiment. According to this variant, the coprocessor comprises ten first-in first-out stacks (FIFO stacks) 701 to 710, linked in parallel to the data bus 11. The number of data words per FIFO determines the number of columns of pixels of the search window. The outputs of the stacks 701 to 710 are linked to a switching circuit 712 possessing ten inputs and eight outputs 714 to 721.

The circuit 712 makes it possible to connect the output of any one of the ten FIFOs to any one of the eight outputs of the circuit. Each FIFO contains a complete line of the search window. The eight FIFOs connected to an output at a given moment correspond to the lines of the band of the search window processed.

The two unconnected extra FIFOs are loaded by way of the data bus from the data stored in the memory 10. The data loaded correspond to the lines of the search window which differ with respect to the bands currently being processed.

Let us assume for example that the first band of eight lines L1 to L8 of a search window is contained in the FIFOs 701 to 708. During the processing of these eight lines, line L9 is loaded into the FIFO 709. When the processing of the first band has terminated, the line L1 stored in the FIFO 701 becomes of no use. In fact, the second band contains lines L2 to L9. The processing of this second band can therefore commence in idle time, since the entire band is present in the FIFOs. The switching circuit 802 of the "crossbar" type will be tasked with re-establishing the correct order of the lines stored before presentation to the systolic arrays 722 to 725.

In the case in which the bands have eight lines, nine FIFOs are sufficient for the operation described. The tenth FIFO is used for example when processing two bands of four lines in parallel.

According to the present variant, four systolic arrays 722 to 725 with four lines and sixteen columns each are connected to the outputs of the switching circuit. By convention, the output 714 will be said to represent the upper line of a band of eight lines, whereas the output 721 will be said to represent the lower line. The first and third arrays (722 and 724 respectively) are connected to the four upper outputs 714 to 717, whereas the second and fourth arrays (723 and 725 respectively) are connected to the four lower outputs 718 to 721.

The above arrangement allows current blocks of different sizes to be processed in a flexible manner. The four arrays can in fact be considered in different ways:

eight arrays of 4*8 elements, each array of 4*16 elements processing two current blocks of 4*8 elements;

four arrays of 8*8 elements;

two arrays of 8*16 elements;

two arrays of 16*16 elements.

In the latter case, the arrays work in interlaced mode, only eight outputs being available and not sixteen. The eight outputs will alternately deliver columns of eight pixels of an upper band and of a lower band of the reference window.

Obviously it is conceivable to use sixteen FIFOs instead of eight (without counting the FIFOs required for loading the next line).

As has been stated previously, the depth of the FIFOs determines the width of the reference window. When working with arrays of 4*8 elements, it is possible to group the FIFOs in pairs and to store the equivalent of a line of pixels of double length in each pair of FIFOs.

FIG. 7 moreover indicates in the form of arrows the manner of grouping the calculational results at the output of each array of 4*16 elements in accordance with the mode of operation.

FIG. 8 illustrates a second variant. Nine FIFOs (grouped together under the reference 801) feed a switching circuit 802. The coprocessor according to the present example contains eight systolic arrays 803 to 810 of 4*8 elements. In fact, two cascaded 4*8 arrays of FIG. 8 are equivalent to a 4*16 array of FIG. 7. FIG. 8 better illustrates the route of the calculational results from each of the arrays when eight current blocks of 4*8 are processed in parallel. The two upper arrays 803 and 804 will be taken by way of example. The final result (that is to say the value of the error function) at the output of the array 803 is transmitted directly to the array 804. Depending on whether working with eight current blocks of 4*8 or four current blocks of 8*8, this result at the output of the array 803 does or does not have to be available for later processing. When working with 8 current blocks of 4*8 pixels, this result will be required for the determination of the motion vector of the current block processed by the array 803.

According to the present variant, a cell M is associated with each array of 4*8 elements. Each cell M determines the minimum value of the error function output by one of the arrays from among all the error values associated with a block and retains in memory the coordinates of the corresponding motion vector. The results are communicated via a specific data bus 811.

The outputs of the arrays 803 and 804, 807 and 808 are each connected to the input of a multiplexer with two inputs, the output of which is connected to the input of the associated cell M. The output of each of the same arrays is also connected to the input of an adder with two inputs which on its other input receives the output from the array immediately below. For the arrays 803, 804, 807 and 808, these are respectively the outputs from the arrays 805, 806, 809 and 810.

When the processor works on eight current blocks of 4*8 pixels each, the output of each array is linked directly to the associated cell M. Each cell M then determines in a self-contained manner the minimum value of the error function and the motion vector. This results in eight individual vectors. The values of the error function output by the arrays 803, 805, 807 and 809 are not transmitted to the arrays which follow them in series.

When the processor works on four blocks of 8*8 pixels, the multiplexers switch over so that one of the cells M associated with two overlaid arrays working on the same block receives the sum of the values of the error functions calculated by these two arrays. For example, the cell M associated with the array 803 will do its calculations on the basis of the values of the error function corresponding to the 8*8 block processed in the arrays 803 and 805. A single vector will result from this. As in the case of the previous paragraph, the values of the error function which arise from the first column of arrays are not transmitted to the second column.

When the processor works on two blocks of 8*16 pixels, only the cells M associated with the arrays 804 and 808 are used. The pairs of 4*8 arrays 803 and 804, 805 and 806, 807 and 808 and finally 809 and 810 are regarded as each merely forming a continuous array of dimensions 4*16. For example, the adder associated with the array 804 adds up the errors emanating from the arrays 804 and 806. The error function values calculated by the arrays 803 and 805 are included within the error function values calculated by the arrays 804 and 806 and transmitted to these latter values by way of the connections between the arrays 803 and 804 respectively 805 and 806.

The principle is identical in the case of the interlaced mode. Put simply, the cell or cells M hold two motion vectors, one for each block.

The controller 2 of FIG. 1 instructs the switching over of the multiplexers as a function of the chosen mode of operation.

FIG. 9 illustrates the arrangement of two reference windows when two current blocks are to be processed. These current blocks bear the references 1 and 2. The references X1Min and X1Max define the abscissae of the reference window corresponding to block 1, whereas X2Min and X2Max define the abscissae of the window corresponding to block 2. The position of blocks 1 and 2 corresponds in the present example substantially to the middle of the windows. It may be seen that the two windows have in common the whole of the part situated between the abscissae X2Min and X1Max.

The systolic coprocessor allows a processing which demands only one pass of the pixels situated between the abscissae X1Min and X2Max for the calculations relating to the two blocks 1 and 2.

As described earlier, two systolic arrays in series (such as for example the two arrays 803 and 804) can process two separate blocks. While the pixel data pass in a transparent manner from one array to the next, the error function values computed by the first array are not simply transmitted to the next array. The two cells M associated with the first and with the second array respectively separately restore the values of the error functions corresponding to each of the two arrays.

FIG. 10 illustrates a first example of the arrangement and introduction of the pixel data into the two systolic arrays in series. The upper band of pixels, located between the abscissae X1Min and X2Max, will be taken by way of illustration. The references A and B denote the positions of the first blocks in the two reference windows, to be compared to the current blocks, and clarify the manner in which the data are introduced into the array.

It appears natural to have block 1 processed by the first systolic array (for example the array 803) and block 2 by the second array (for example 804). Thus, this arrangement corresponds to the natural arrangement of blocks 1 and 2 in the current image. Moreover, when the two arrays work in series (according to another mode of operation) on a block of double size with respect to the size of one of the blocks 1 or 2, this arrangement would be just as natural.

Now, it is apparent that this arrangement has disadvantages in relation to the inventive method described below and illustrated by FIG. 11.

It may be seen in Table 1 that for arrays 8 pixels long, the calculation performed for the last column of the first reference block is performed only at cycle 15.

If the arrangement of FIG. 10 is considered, the calculations relating to block A and to block 1 will be finished after cycle 15. Those corresponding to block 2 and B will only begin at cycle 17 when the whole of block B has crossed the first array.

It is therefore seen that the first valid result (corresponding to block A) from the first array will not be available at the same time as the first valid result (corresponding to block B) from the second array.

This demands staggered management of the results from each of the two arrays, this rendering the system more complex.

Moreover, the band has to pass into the array until block C of FIG. 10 is completely inside the second array. This implies that $2*(X2Max-X1Min+X2Min-X1Min)$ cycles will be required to process the complete band. The first array will perform non-useful calculations while block C is entering the second array and conversely the second array will perform non-useful calculations while waiting for the first column of pixels of block B to reach it across the first array. According to a variant embodiment, this drawback is minimized by processing all the bands of an image continuously, inserting one band after the other into the systolic array without leaving gaps.

FIG. 11 illustrates a particular example of the method according to the invention. The two blocks 1 and 2 are stored in such a way that their arrangement is the reverse of their arrangement in the current image. In this instance, block 2 is stored in the first array, whereas block 1 is stored in the next array.

Thus, block A will be processed by the second array at the same time as block B is processed by the first array and the results for one and the same band will be available in parallel and at the same time for both blocks. So long as the first column of pixels of block A has not reached the second array, the calculations performed by the two arrays are non-useful (at least if the calculation of a previous band is not about to finish). However, it will not be necessary to wait for block C to cross the first array completely, since it will be processed solely by this first array. There is therefore a saving of processing time corresponding to a complete block (16 cycles), either per band processed, or per image processed when considering continuous introduction of bands.

According to a variant embodiment of the invention, the results delivered by the first array are taken into account even as regards the pixels corresponding to block A. This introduces an asymmetry of the reference window about the position of block 2. Insofar as this asymmetry is not troublesome (the motion vectors thus determined may not have maximum negative and positive components of equal amplitude), this variant widens the reference field without increasing the overall calculation time. This variant can just as well be applied to the beginning of a band as to its end. Nevertheless, in this case the advantage of the results for the two blocks being available at the same time is lost.

It should be noted that the reversing of blocks 1 and 2 with respect to the arrangement of FIG. 10 amounts to the same as retaining the arrangement of this FIG. 10 and of introducing the band of pixels while reversing its direction, that is to say commencing with the pixels with abscissa X2Max and terminating with those with abscissa X1Min. In this case, the pixels in each of the current blocks 1 and 2 are reversed. This embodiment is illustrated by FIG. 12.

The invention is not limited to the example of the systolic array described, but applies equally to other types of arrays used especially for motion estimation.

Furthermore, more than two arrays can be placed in series.

We claim:

1. A method for determining distortion function values in a motion estimation system comprising at least two arrays of distortion function calculation elements arranged in series, each array being adapted to calculate a distortion between a block of pixels of a current image stored therein and a block of pixels from a reference window inserted in the form of pixel bands into said arrays at one extremity of said series of arrays and shifted through said series of arrays, said method comprising the steps of:

selecting a series of adjacent pixel blocks from said current image:

storing said series of adjacent pixel blocks in a series of adjacent arrays in one of,
   (a) the order of adjacency of said blocks, and
   (b) the inverse order of adjacency of said blocks; and introducing into an extremity of said series of arrays a band of pixels of a composite reference window encompassing reference windows corresponding to each block of said series of adjacent pixel blocks, wherein said storing order of said series of pixel blocks and the direction of introduction of said band of pixels into said series of arrays are such that the last part of said band introduced into said series of arrays corresponds to a part of the reference window of the pixel block stored in the array of said series of arrays which is first in the direction of introduction.

2. A method according to claim 1, wherein a reference window corresponding to a pixel block of said current image is centered, in a reference image around the position of said pixel block of said current image, the reference windows of two adjacent blocks being offset by one block.

3. A method according to claim 1, wherein said series of arrays comprises a left and a right array a first pixel block from said current image and a second pixel block horizontally adjacent to the right of said first pixel block being stored respectively in said left and said right array bands of said composite reference window being introduced starting from their right extremity into said left array.

4. A method according to claim 1, wherein said series of arrays comprises a left and a right array a first pixel block from said current image and a second pixel block horizontally adjacent to the right of said first pixel block being stored respectively in said right and said left array bands of said composite reference window being introduced starting from their left extremity into said left array.

5. Method according to claim 1, further comprising the steps of:

shifting said band through the entire series of said arrays; and controlling at least one of said arrays for carrying out distortion calculations for sections of said band of said composite reference window exclusive of a reference window of a block stored in at least one of said arrays.

* * * * *